US010255082B2

(12) United States Patent
Deguzman

(10) Patent No.: US 10,255,082 B2
(45) Date of Patent: Apr. 9, 2019

(54) VIDEO MONITORING

(71) Applicant: Oath Inc., New York, NY (US)

(72) Inventor: Lawrence Anthony Deguzman, Santa Clara, CA (US)

(73) Assignee: Oath Inc., New York, NY (US)

( * ) Notice: Subject to any disclaimer, the term of this patent is extended or adjusted under 35 U.S.C. 154(b) by 93 days.

(21) Appl. No.: 15/135,708

(22) Filed: Apr. 22, 2016

(65) Prior Publication Data

US 2017/0309255 A1  Oct. 26, 2017

(51) Int. Cl.
| | | |
|---|---|---|
| *G06F 9/44* | (2018.01) | |
| *G06F 9/451* | (2018.01) | |
| *G06Q 30/02* | (2012.01) | |
| *G09G 5/36* | (2006.01) | |

(52) U.S. Cl.
CPC .............. *G06F 9/451* (2018.02); *G06F 9/44* (2013.01); *G06Q 30/0277* (2013.01); *G09G 5/36* (2013.01); *G09G 2340/10* (2013.01)

(58) Field of Classification Search
CPC ........................... G09G 5/14; G09G 2340/125
USPC ......................................................... 345/634
See application file for complete search history.

(56) References Cited

U.S. PATENT DOCUMENTS

| | | | |
|---|---|---|---|
| 9,214,135 B2 | 12/2015 | Deguzman | |
| 2009/0033680 A1* | 2/2009 | Lee ................... | H04N 5/44504 345/629 |
| 2010/0023398 A1* | 1/2010 | Brown ................. | G06Q 30/02 705/14.49 |
| 2010/0269030 A1* | 10/2010 | Dugonjic ............. | G06Q 30/02 715/207 |
| 2012/0121175 A1* | 5/2012 | Narayanan ........... | G06T 9/007 382/166 |
| 2013/0021375 A1* | 1/2013 | Deguzman ............ | G09G 5/14 345/634 |
| 2015/0262400 A1* | 9/2015 | Howell ................. | G06T 11/60 378/87 |
| 2015/0296250 A1* | 10/2015 | Casper ............... | H04N 21/4316 725/34 |
| 2016/0267576 A1* | 9/2016 | Crossman Sullivan .................... G06Q 30/0601 |

* cited by examiner

*Primary Examiner* — Jin Ge
(74) *Attorney, Agent, or Firm* — Cooper Legal Group, LLC

(57) ABSTRACT

One or more computing devices, systems, and/or methods for monitoring a video are provided. For example, the video may be rendered within a canvas overlaying a webpage within a web browser. The video may comprise an opaque portion (e.g., a bike) and a transparent portion (e.g., a transparent background such that the bike appears to be driving across the webpage as the video plays). User input associated with the canvas may be evaluated to determine whether the user input occurs over the opaque portion or the transparent portion. Responsive to the user input occurring over the opaque portion, the web browser may be transitioned from the webpage to a biking website linked to by the video. Responsive to the user input occurring over the transparent portion, the canvas may be closed to terminate the video.

20 Claims, 10 Drawing Sheets

VIDEO MONITORING

BACKGROUND

Many users may access content, such as webpages, through user interfaces such as web browsers. In an example, a user may access a social network website for viewing and sharing social network posts with friends. In another example, the user may access a news website for viewing sports scores, entertainment news, and cooking suggestions. In this way, users may access a variety of content through user interfaces. Access to content may be costly not only to consumers of such content but also to content publishers of the content. For example, the user may pay for a monthly data plan so that a mobile device can access content over a network. In another example, a content publisher may pay for resources used to generate and provide content, and may also pay a network service provider for network bandwidth usage to deliver the content to consumers. The cost of content publishers providing content to consumers may increase as the amount of data is consumed by consumers, which can become wasteful when consumers are provided with irrelevant or uninteresting content.

Some content publishers may provide users with access to webpages where a video or other content may be overlaid the webpages. For example, a user may navigate to the news website in order to view daily sports scores. A news content publisher, that hosts the news website, may allow a thirty party content publisher (e.g., a car dealership that hosts a car dealership website) to play a video, that overlays at least some of a sports news webpage, for 15 seconds. The video may have a transparent background, such that some of the sports news webpage may still be visible, and a car may appear to be driving across the screen (e.g., the car may appear to be driving across the sports news webpage because of the transparent background). The video may play within a canvas that overlays the sports news webpage. The canvas may comprise any type of user interface element (e.g., a HyperText Markup Language (HTML) element of HTML5 that uses <canvas> tags, which may be contained in <div> tags), which may overlay another user interface element of a webpage.

The canvas and video may be treated as a single element, such that when the user clicks anywhere on the canvas, a click event may occur without consideration of whether the user clicked on the car (e.g., indicating that the user has an interest in the car, and thus may desire to visit the car dealership website) or on a transparent portion within the canvas (e.g., indicating that the user is not interested in the car, and would like the video to be removed so that the user can continue to access the sports news webpage without interruption). Unfortunately, without the ability to discern whether the user clicked an opaque portion of the video such as the car or the transparent portion of the video, the news content publisher must specify a rule where the video is always closed upon click events of the canvas (e.g., but unfortunately losing an opportunity to route users to the car dealership website that may otherwise be interesting to some users) or where users are always transitioned to the car dealership website upon click events of the canvas (e.g., wasting bandwidth and computing resources, incurring costs associated with providing irrelevant content, and/or decreasing users' experience where such users are not interested in the car dealership website).

SUMMARY

In accordance with the present disclosure, one or more computing devices and/or methods for monitoring videos are provided. In an example, a video, being rendered within a canvas overlaying content of a webpage displayed through a user interface, may be identified (e.g., a video of an airplane may be rendered within a canvas overlaying a shopping webpage, where a background of the video is transparent so that the airplane appears to be flying over the shopping webpage). In an example, the video may be rendered based upon a grayscale video of the video and a color video of the video (e.g., grayscale percentages of the grayscale video may be added to color pixels of the color video to create alpha color pixels that are displayed through the canvas, thus allowing for the rendering of a transparent background). A temporary array may be created and populated with transparency data of the video. For example, a grayscale array, of the grayscale video, may be traversed to populate the temporary array with transparency values (e.g., alpha values) corresponding to amounts of black within the grayscale video.

A position of a pointer may be tracked with respect to the canvas (e.g., or a touch display may be tracked to identify a position of a touch input). Responsive to receiving a user input while the position of the pointer corresponds to a portion of the video (e.g., the user may click or touch gesture within a boundary of the canvas), coordinates of the position of the pointer may be transformed into a lookup value (e.g., a linear transformation may be performed from Cartesian coordinates to a linear array position lookup value). A transparency value (e.g., a percentage of opaqueness of a portion of the video at which the user input occurred) may be identified at an array position, in the temporary array, that corresponds to the lookup value.

Responsive to the transparency value being greater than or equal to the threshold value (e.g., the percentage of opaqueness is greater than the threshold value such as greater than 35% opaqueness, and thus the user may have clicked on the airplane), a first action may be performed upon the canvas (e.g., the user interface may be transitioned from displaying the sports news webpage and canvas to displaying an airplane ticketing website linked to by the video because the user clicking on the airplane may be indicative of user interest in the airplane and thus user interest in the airplane ticketing website). Responsive to the transparency value being less than the threshold value (e.g., the percentage of opaqueness is less than the threshold value such as less than 35% opaqueness, and thus the user may have clicked on a transparent portion of the video), a second action may be performed upon the canvas (e.g., the canvas may be closed to terminate the video because the user clicking on the transparent portion of the video may be indicative of the user not having an interest in the airplane and thus not having an interest in the airplane ticketing website).

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
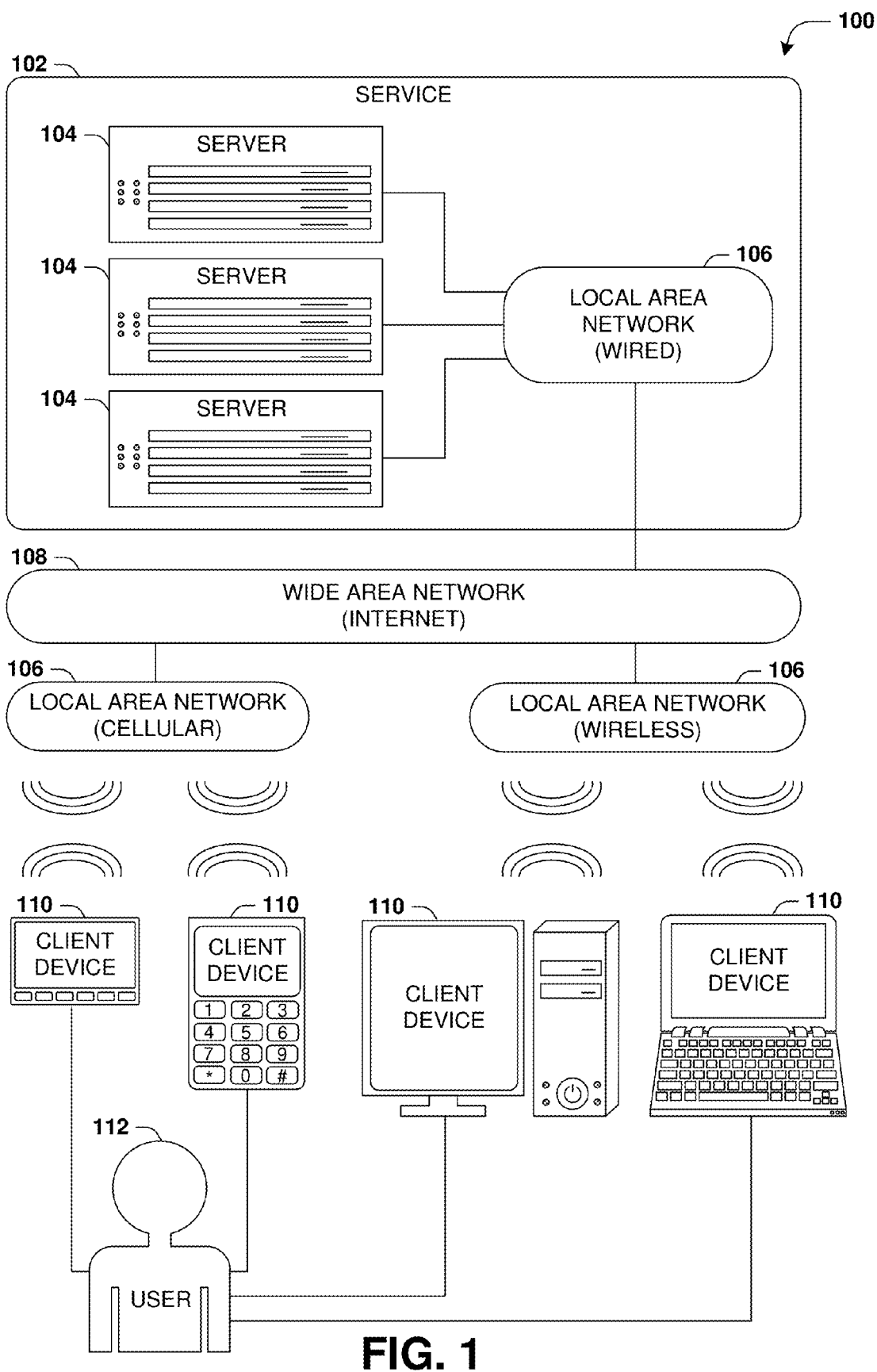
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
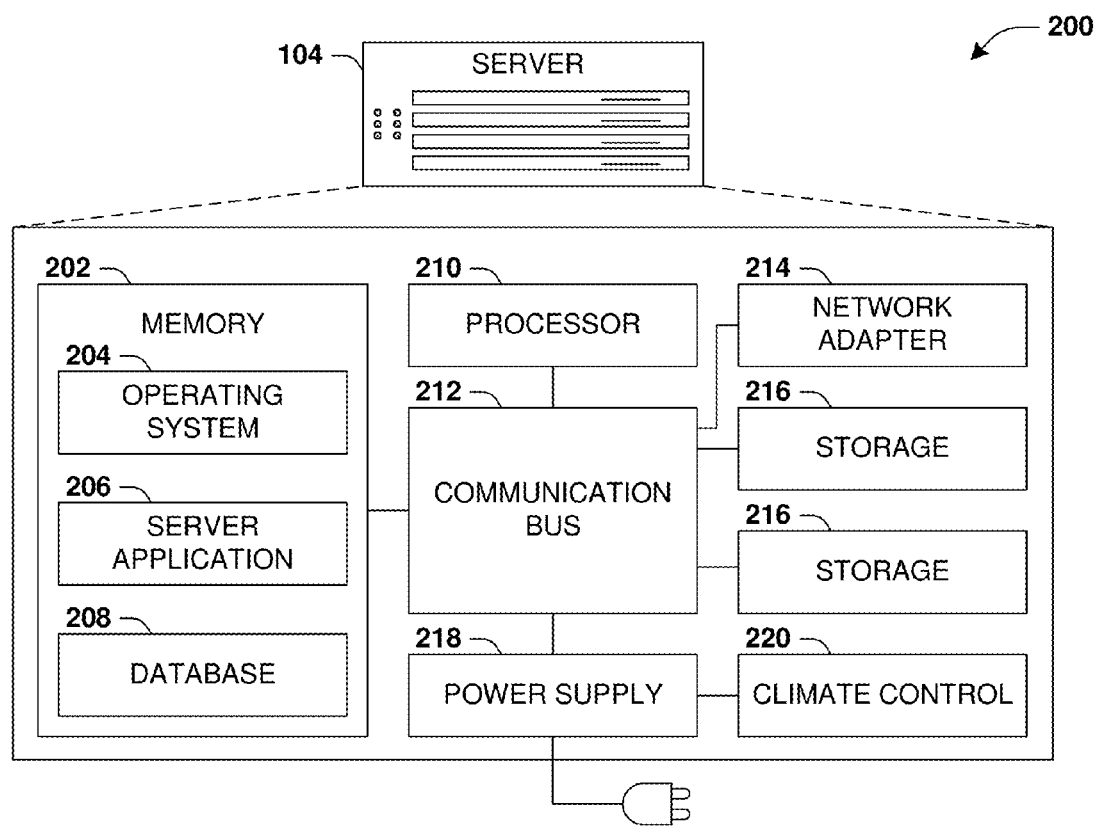
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
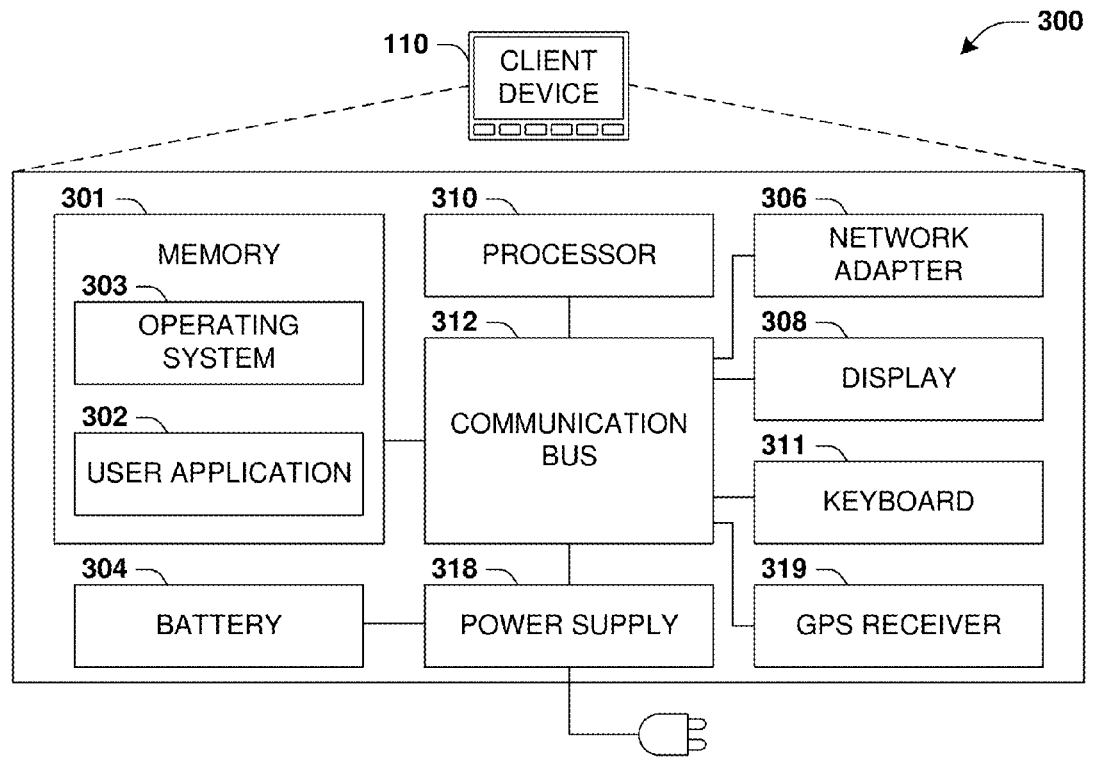
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for monitoring videos are provided. A content publisher may provide users with content through user interfaces, such as a webpage provided through a web browser. The content publisher may allow another content publisher, such as a third party content publisher, to play a video through a canvas that may overlay at least some of the webpage. The video may have a transparent background, such that some of the webpage may still be visible through the canvas (e.g., a video of a bike may appear to a user as though the bike is driving across a videogame webpage because the video has a transparent background). When the user clicks on the video through the canvas, a click input event does not distinguish between whether the user clicked on an opaque portion of the video (e.g., the user may click the bike, thus indicating that the bike and a biking website linked to by the video may be relevant to the user) or a transparent portion of the video (e.g., the user may click on the transparent background overlaying a videogame review link of the videogame webpage, thus indicating that the user is more interested in the videogame review link than the bike or the biking website). The content provider can specify a rule that the video is always terminated upon click input events (e.g., so that uninterested users do not have a poor experience by being transitioned to unwanted content, which otherwise wastes computing resources and bandwidth) or that users are always transitioned to the biking website upon click input events (e.g., so that interested users can access the biking website).

Unfortunately, always terminating the video may waste opportunities to transition interested users to the biking website, while always transitioning to the biking website wastes significant computing resources and costly network bandwidth (e.g., costly data of a user data plan and/or costly bandwidth purchased from a network service provider by the content publisher) and provides a poor user experience for uninterested users. Accordingly, as provided herein, an appropriate action (e.g., dynamically determining in real-time whether to terminate the video or transition to the linked to webpage based upon current user actions) may be taken based upon distinguishing between whether user input, with the video within the canvas, is associated with a transparent portion of the video or an opaque portion of the video (e.g., the bike). In this way, computing resources and/or network bandwidth are efficiently utilized or conserved by merely providing users with relevant content.

Figure 4:
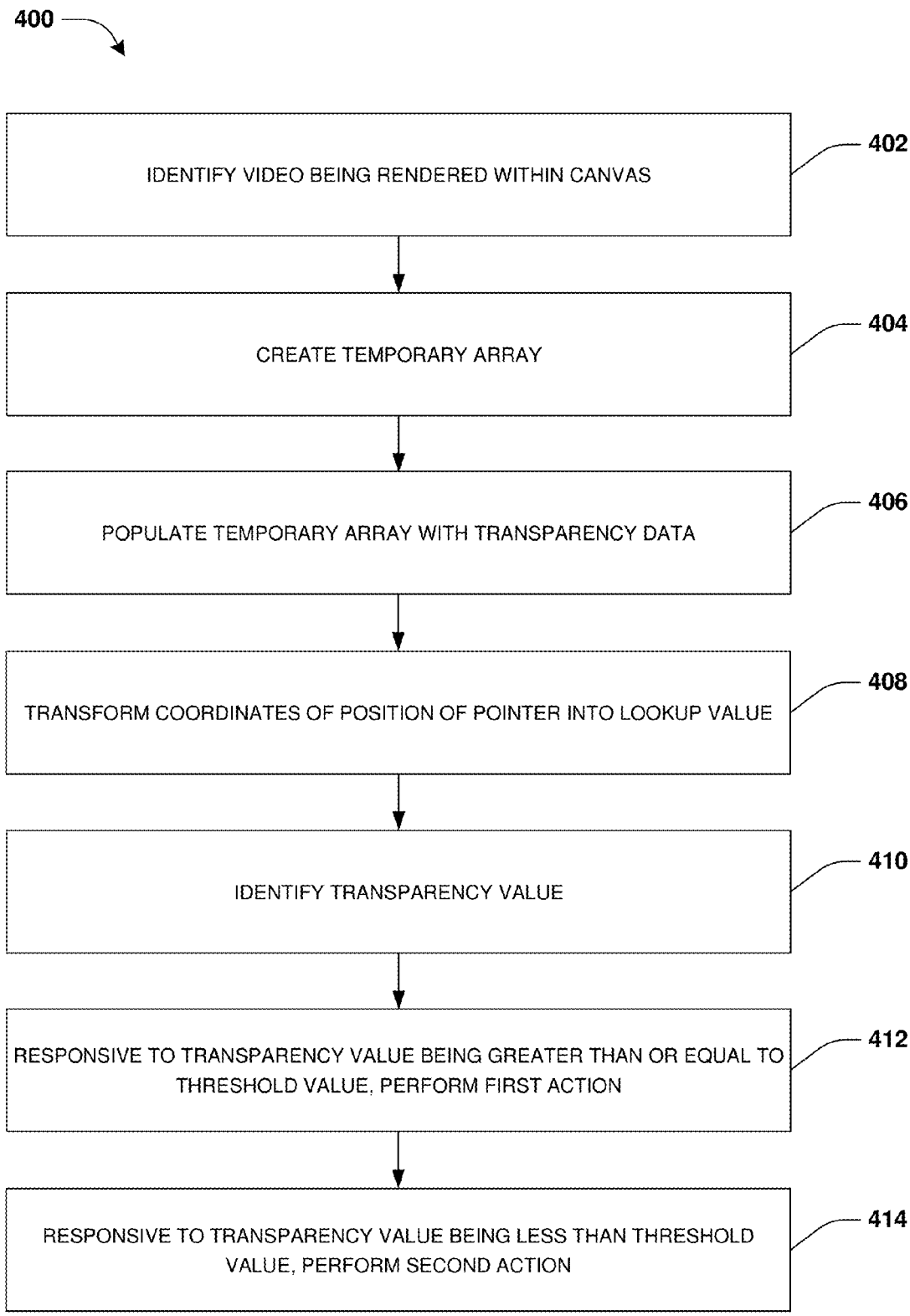
FIG. 4 is a flow chart illustrating an example method for monitoring a video.

An embodiment of monitoring a video is illustrated by an example method 400 of FIG. 4. A content publisher may provide users with access to content, such as a webpage, that is accessible through a user interface such as a web browser (e.g., a user may access a funny cat jokes website). At 402, a video, being rendered within a canvas overlying content of the webpage displayed through the user interface, may be identified. The canvas may comprise any type of user interface element (e.g., a HyperText Markup Language (HTML) element of HTML5 that uses <canvas> tags, which may be contained in <div> tags), which may overlay another user interface element of a webpage. The video may comprise an opaque portion (e.g., a bird) and a transparent portion (e.g., a transparent background through which some of the funny cat jokes website may be visible). In an example, the video may be rendered within the canvas based upon imagery of a color video of the video and transparency values (e.g., alpha transparency values indicating a degree of opaqueness) of a grayscale video of the video. For example, a picture of the color video may be captured. The picture may comprise color pixels (e.g., RRGGBB pixels). Grayscale percentages of pixels within the grayscale video may be calculated (e.g., and stored within a grayscale array), which may be based upon amounts of black within a frame of the grayscale video. The grayscale percentages may be added to the color pixels of the picture to create alpha color pixels (e.g., AARRGGBB pixels) that are displayed through the canvas (e.g., as opposed to playing the actual video through the canvas, thus providing the ability to create transparent backgrounds for the color video). The color video and/or the grayscale video may be played outside a view region of a device hosting the user interface so that the user does not see the color video and/or the grayscale video.

At 404, a temporary array may be created. The temporary array may comprise a linear byte array within which transparency values (e.g., alpha transparency values within the grayscale array) may be stored. A transparency value, such as an alpha transparency value, may be indicative of a degree of opaqueness (e.g., a larger transparency value may be indicative of a more opaque portion of the video such as the bird). At 406, the temporary array may be populated with transparency data of the video. For example, the grayscale array may be traversed to populate the temporary array with transparency values corresponding to amounts of black within the grayscale video. In an example, transparency values at every $n^{th}$ position (e.g., based upon a number of pixels used for a pointer pixel image used to track a position of a pointer, such as every $4^{th}$ position for a 2×2 pixel image) may be transferred into the temporary array. The temporary array may be repopulated (e.g., deleted, recreated, and repopulated) with new transparency data at a fixed rate (e.g., every 30 milliseconds).

At 406, the position of the pointer with respect to the canvas may be tracked (e.g., or a touch display may be monitored to identify user input, such as a touch gesture, with respect to the canvas). For example, the pointer pixel image (e.g., a 2×2 pixel image or any other number or grouping/shape of pixels) may be created to represent the position of the pointer. A location of the pointer pixel image may be updated based upon changes in position of the pointer. In an example, the pointer pixel image may be offset from the canvas by an offset such that the pointer pixel image is not visible to the user (e.g., positioned outside the view region of the device hosting the user interface so that the user does not see the pointer pixel image regardless of locational changes of the pointer pixel image occurring due to changes in position of the pointer).

Responsive to receiving a user input while the position of the pointer corresponds to a portion of the video (e.g., or the user input corresponding to a touch gesture over the portion of the video), coordinates of the position of the pointer (e.g., or of the touch gesture) may be transformed into a lookup value, at 408. For example, Cartesian coordinates of the position of the pointer may be transformed into a linear lookup value into the temporary array because the temporary array may comprise a linear array of transparency values. At 410, a transparency value (e.g., an alpha transparency value indicative of a degree of opaqueness of the portion of the video), at an array position in the temporary array corresponding to the lookup value, may be identified. The larger the transparency value, the more opaque the portion of the video (e.g., more indicative of the user clicking on the bird). The smaller the transparency value, the more transparent the portion of the video (e.g., more indicative of the user click on the transparent background, such as the user attempting to click on a funny cat joke within the funny cat jokes website).

At 412, responsive to the transparency value being greater than or equal to a threshold value (e.g., indicative of the portion of the video being an opaque portion such as the bird), a first action may be performed upon the canvas. For example, a target webpage, linked to by the video, may be identified (e.g., a bird house building webpage). The user interface may be transitioned from the funny cat jokes website to the bird house building webpage because the user clicked on the opaque portion, such as the bird, of the video, and thus may be interested in the bird house building webpage.

At 414, responsive to the transparency value being less than the threshold value (e.g., indicative of the portion of the video being a transparent portion such as the transparent background), a second action may be performed upon the canvas. For example, the canvas may be closed to terminate the video because the user clicked on the transparent portion of the video, and thus may not be interested in the bird house building webpage. In an example, the threshold value may be selected based upon who is the content provider of the video (e.g., a larger amount of opaqueness may be set for a certain content provider before triggering the first action).

Figure 5A:
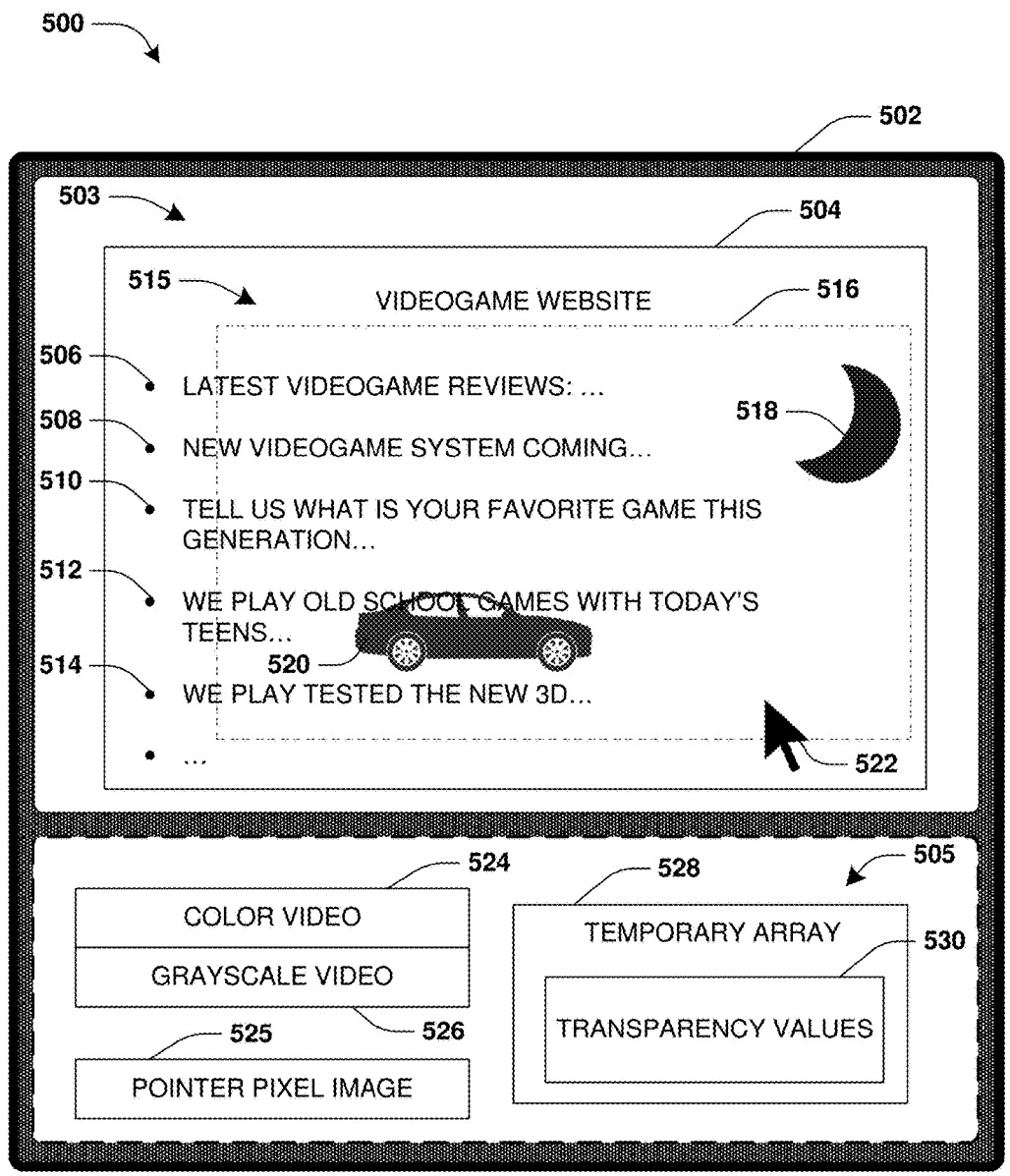
FIG. 5A is a component block diagram illustrating an example system for monitoring a video, where the video is rendered within a canvas overlaying a webpage.
Figure 5B:
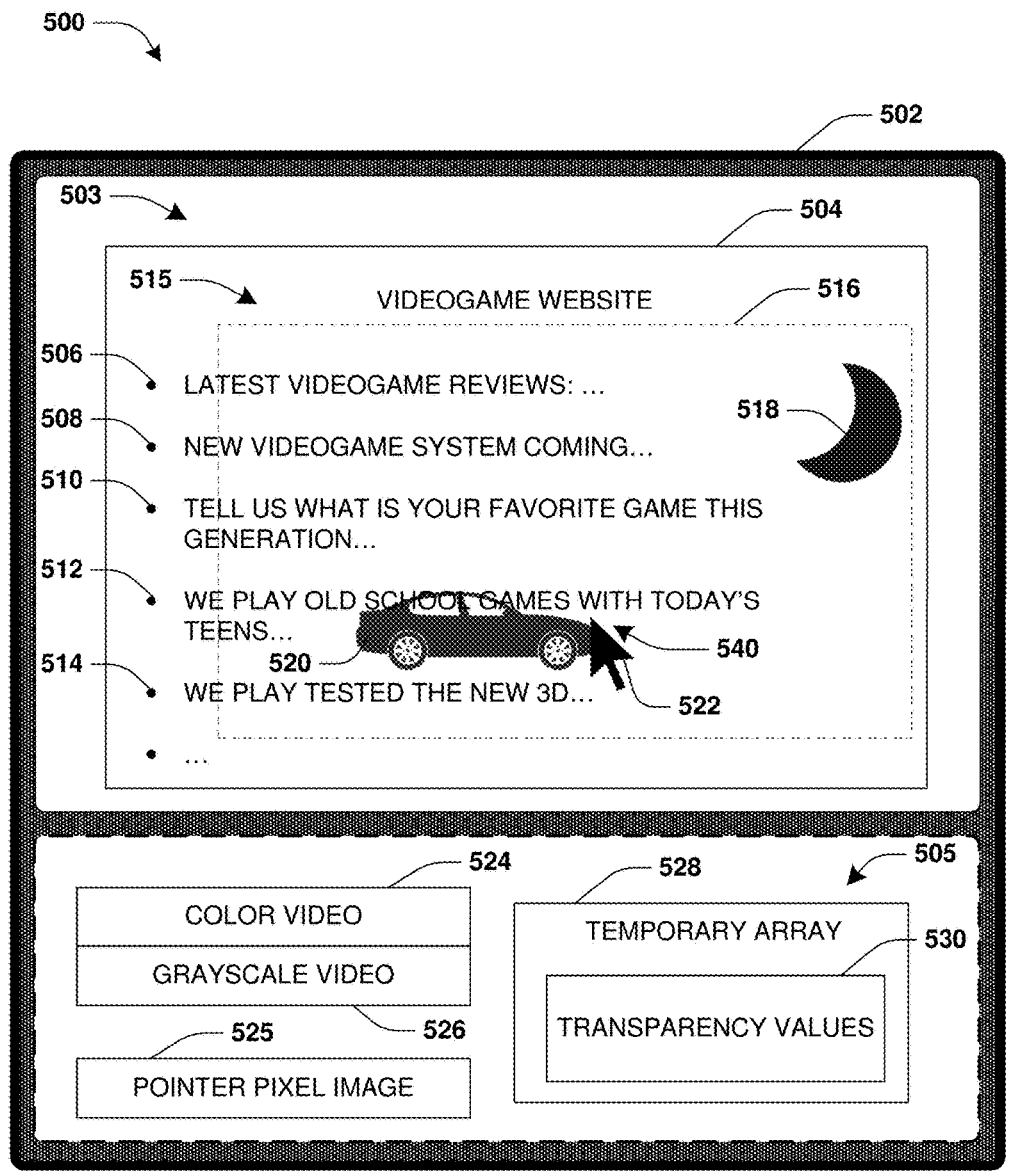
FIG. 5B is a component block diagram illustrating an example system for monitoring a video, where a transparency value of a portion of the video is identified.
Figure 5C:
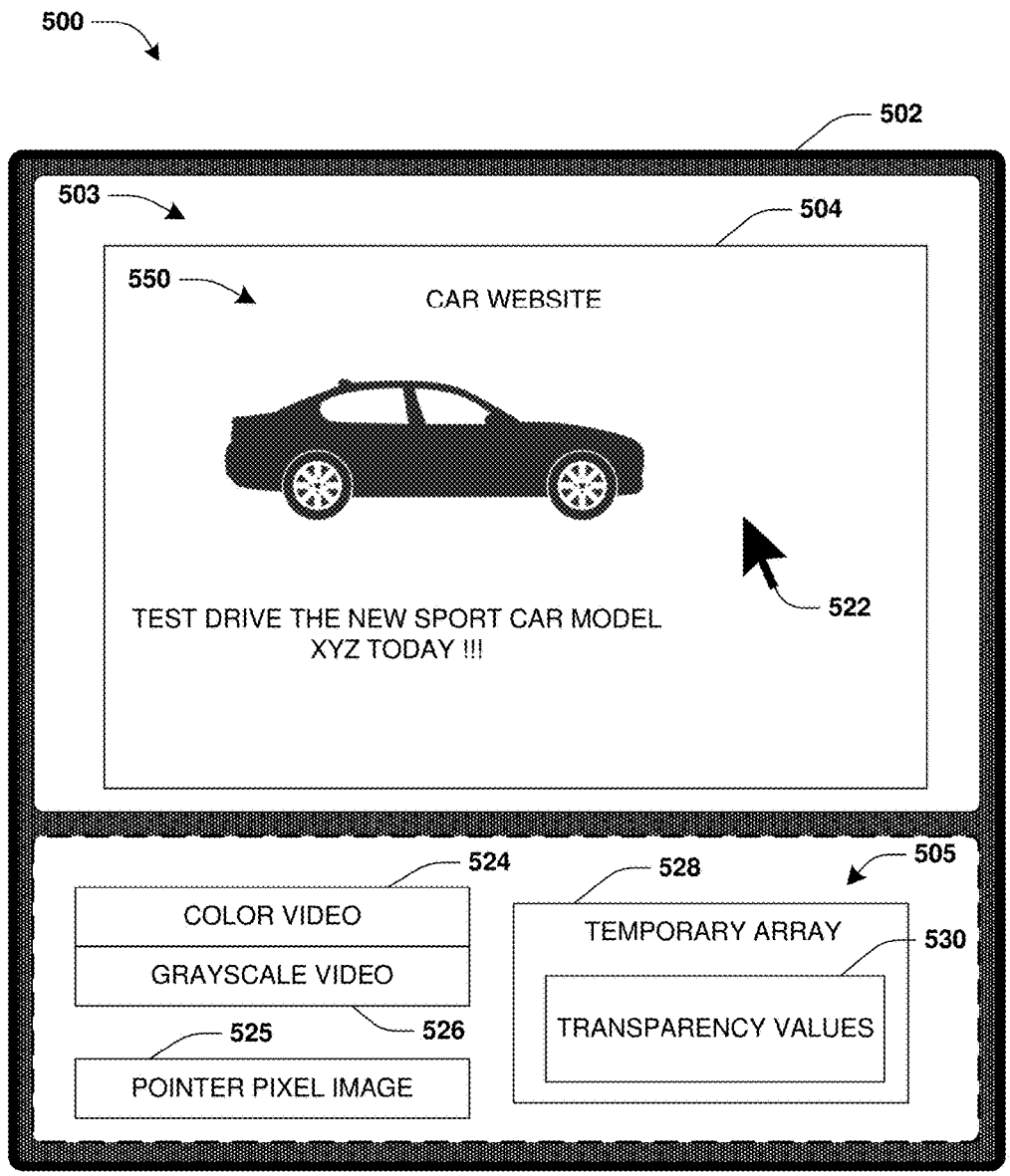
FIG. 5C is a component block diagram illustrating an example system for monitoring a video, where a web browser is transitioned to a webpage linked to by the video.

FIGS. 5A-5C illustrate examples of a system 500 for monitoring a video. FIG. 5A illustrates a user device 502 accessing a videogame website 515 using a web browser 504. The web browser 504 may be displayed within a visible display region 503 of the user device 502. The videogame website 515 may comprise one or more elements, such as a first link 506 to the latest videogame reviews, a second link 508 to a new videogame system article, a third link 510 to provide comments on favorite videogames, a fourth link 512 to watch teens play old school games, a fifth link 514 to a 3D playtest article, etc.

A canvas 516 may be displayed overlaying the videogame website 515. It may be appreciated that a boundary of the canvas 516 may not be visible and is merely illustrated with dashed lined for illustrative purposes. A video may be rendered within the canvas 516. The video may depict one or more opaque elements such as a moon 518 and a car 520 (e.g., the car 520 may drive across the web browser 504 from left to right as the video plays). The video may have a transparent background, such that a user may be able to see underlying portions of the videogame website 515 notwithstanding the canvas 516 overlaying such portions (e.g., the car 520 may appear to be driving across the videogame website 515). Instead of playing the actual video, a color video 524 of the video and a grayscale video 526 of the video may be played within a non-visible region 505 of the user device 502. Grayscale percentages of the grayscale video 526 may be applied to color pixels of the color video 524 to create alpha color pixels that are displayed through the canvas 516 for rendering the video. In this way, the alpha color pixels may be used to render the moon 518, the car 520, and the transparent background. Transparency values 530 of the grayscale video 526 may be populated within a temporary array 528. The transparency values 530 may be updated as the grayscale video 526 plays.

A pointer pixel image 525 may be created, such as within the non-visible region 505 of the user device 502 (e.g., offset from the canvas 516 by an offset so that the pointer pixel image 525 is not visible to the user). A location of the pointer pixel image 525 may be used to represent a position of a pointer 522. For example, as the pointer 522 is moved, the location of the pointer pixel image 525 may be updated based upon changes to the position of the pointer 522.

FIG. 5B illustrates the user moving the pointer 522 to a position that overlays the car 520 of the video being rendered within the canvas 516, and clicking the car 520 at a click position 540. In an example, a current location of the pointer pixel image 525 (e.g., updated based upon the pointer 522 moving to the click position 54) may be used to identify Cartesian coordinates of the pointer 522 based upon the offset. A linear equivalent of the click position 540 is calculated as a lookup value from localization of the Cartesian coordinates based upon the offset, where LinearPosition=Math.floor(offset.y*config.width)+offset.x−1) wherein Linear Position is the linear equivalent of the click position 540, offset represents an object comprising localized Cartesian coordinates (e.g., offset.y is a y offset value along a y-coordinate and offset.x is an x offset value along an x-coordinate), Math.floor is a function that returns a largest integer less than or equal to a given number, and config.width is a configuration width setting. The lookup value is used to identify a transparency value within the temporary array 528. In an example, the transparency value is indicative of a 98% opaqueness of a portion of the video at the click position 540, such as the car 520. FIG. 5C illustrates the web browser 504 being transitioned from the videogame website 515 to a car website 550 linked to by the video. For example, the web browser 504 may be transitioned to the car website 550 based upon the transparency value being greater than a threshold (e.g., 98% opaqueness being greater than a 40% threshold opaque value), which may indicate that the user attempted to click on an opaque portion of the video, such as the car 520, because the user has an interest in the video, and thus may have an interest in the car website 550.

Figure 6A:
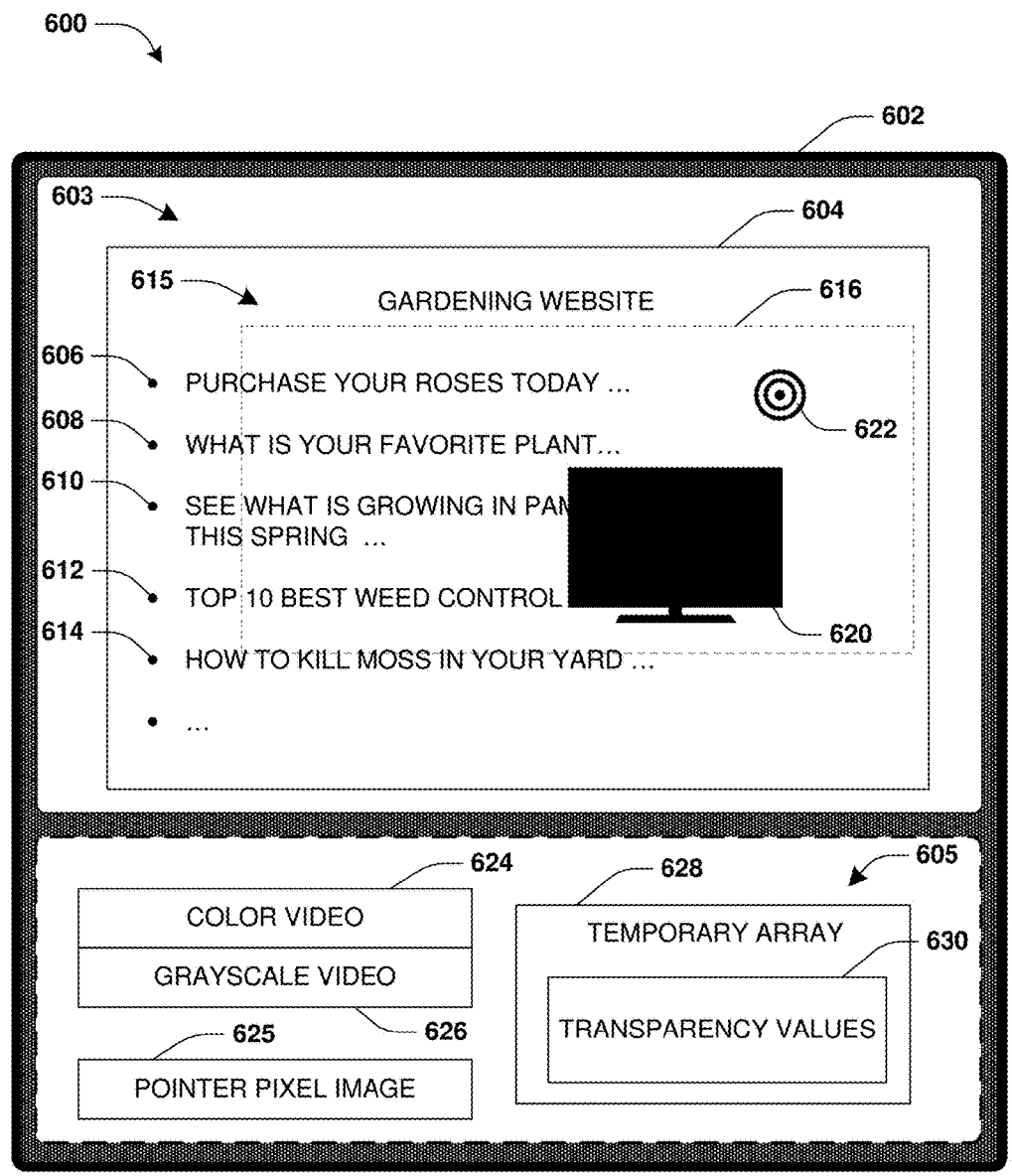
FIG. 6A is a component block diagram illustrating an example system for monitoring a video, where the video is rendered within a canvas overlaying a webpage.
Figure 6B:
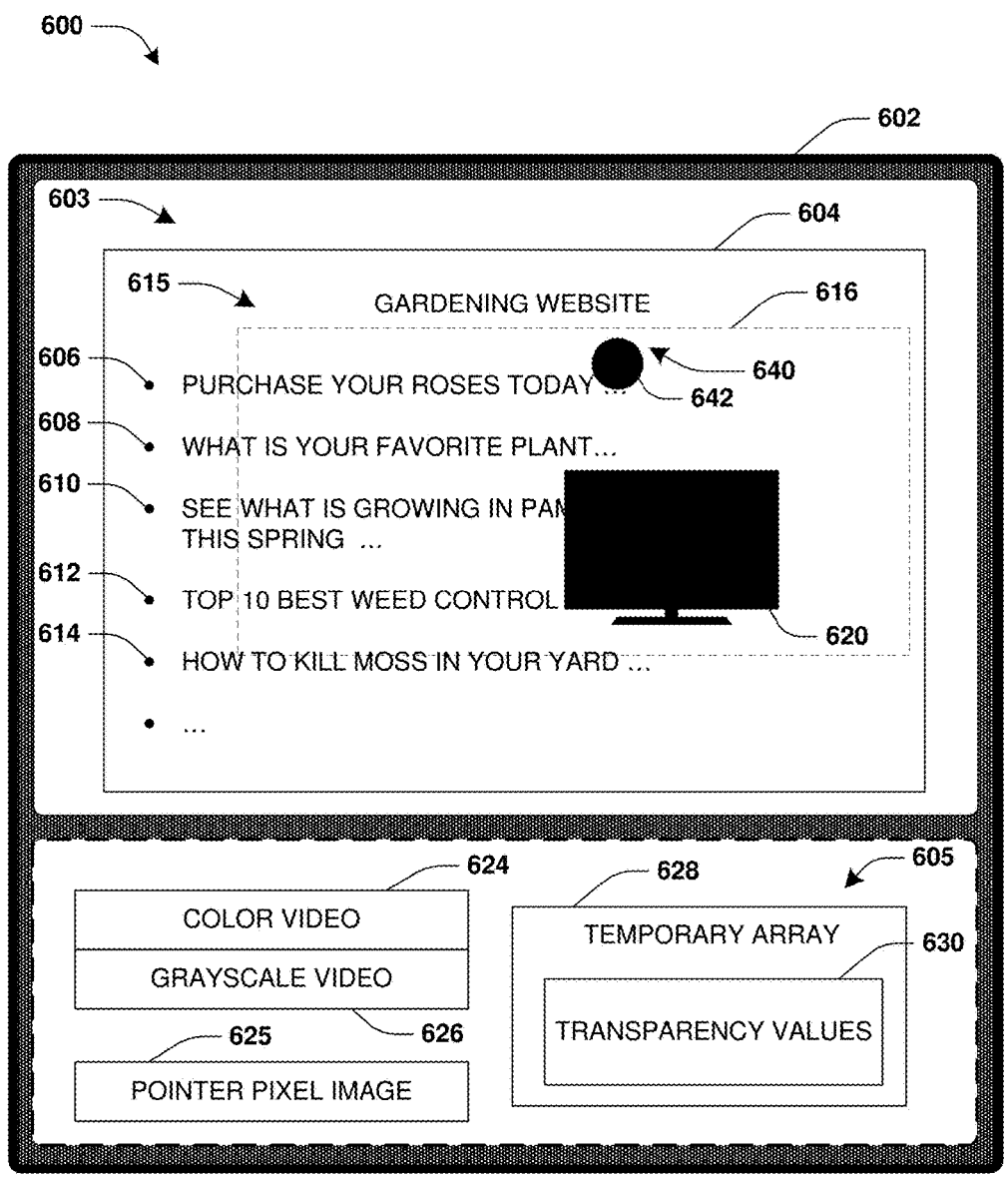
FIG. 6B is a component block diagram illustrating an example system for monitoring a video, where a transparency value of a portion of the video is identified.
Figure 6C:
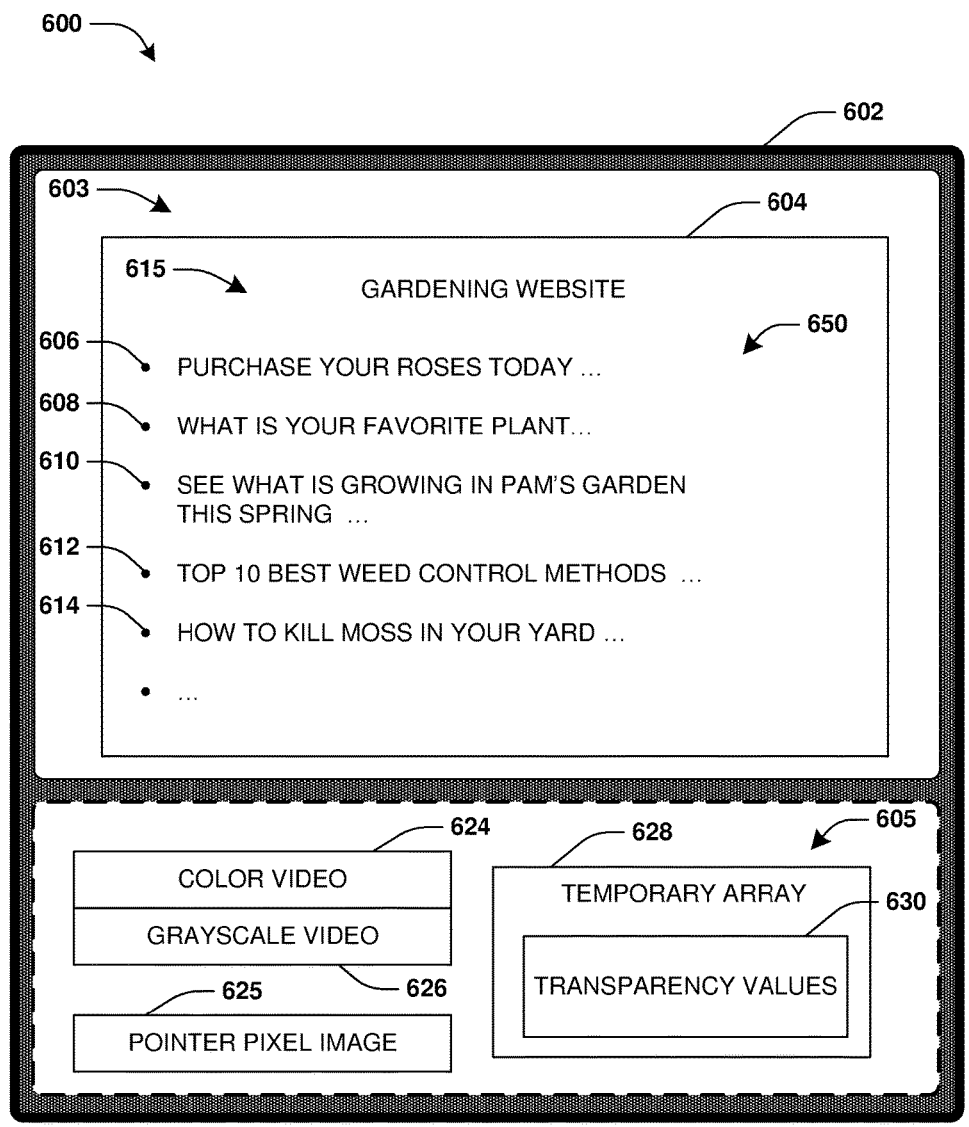
FIG. 6C is a component block diagram illustrating an example system for monitoring a video, where a canvas, within which the video is rendered, is closed to terminate the video.

FIGS. 6A-6C illustrate examples of a system 600 for monitoring a video. FIG. 6A illustrates a user device 602 accessing a gardening website 615 using a web browser 604. The web browser 604 may be displayed within a visible display region 603 of the user device 602. The gardening website 615 may comprise one or more elements, such as a first link 606 to purchase roses, a second link 608 to discuss favorite plants, a third link 610 to view garden images, a fourth link 612 to a top weed control list, a fifth link 614 to a how to kill moss article, etc.

A canvas 616 may be displayed overlaying the gardening website 615. It may be appreciated that a boundary of the canvas 616 may not be visible and is merely illustrated with dashed lined for illustrative purposes. A video may be rendered within the canvas 616. The video may depict one or more opaque elements such as a computer monitor 620 (e.g., the computer monitor 620 may bounce around as the video plays). The video may have a transparent background, such that a user may be able to see underlying portions of the gardening website 615 notwithstanding the canvas 616 overlaying such portions (e.g., the computer monitor 620 may appear to bounce around the gardening website 615). Instead of playing the actual video, a color video 624 of the video and a grayscale video 626 of the video may be played within a non-visible region 605 of the user device 602.

Grayscale percentages of the grayscale video 626 may be applied to color pixels of the color video 624 to create alpha color pixels that are displayed through the canvas 616 as the video. In this way, the alpha color pixels may be used to render the computer monitor 620 and the transparent background. Transparency values 630 of the grayscale video 626 may be populated within a temporary array 628. The transparency values 630 may be updated as the grayscale video 626 plays.

A pointer pixel image 625 may be created, such as within the non-visible region 605 of the user device 602 (e.g., offset from the canvas 616 by an offset so that the pointer pixel image 625 is not visible to the user). A location of the pointer pixel image 625 may be used to represent a position of user input, such as a touch location 622 at which a user may touch a display of the user device 602. For example, as the touch location 622 is moved, the location of the pointer pixel image 625 may be updated based upon changes to the touch location 622.

FIG. 6B illustrates the user performing a touch and release gesture 642 at a touch position 640 that overlays the transparent background of the video. In an example, a current location of the pointer pixel image 625 may be used to identify Cartesian coordinates of the touch and release gesture 642 based upon the offset. A linear equivalent of the touch position 640 is calculated as a lookup value from localization of the Cartesian coordinates. The lookup value is used to identify a transparency value within the temporary array 628. In an example, the transparency value is indicative of a 2% opaqueness of a portion of the video at the touch position 640, such as the transparent background overlaying the first link 606. FIG. 6C illustrates the canvas 616 being closed to terminate the video based upon the transparency value being less than a threshold (e.g., 2% opaqueness being less than a 40% threshold opaque value), which may indicate that the user is not interested in the video, such as content linked to by the video (e.g., the user may be interested in interacting with the first link 606).

Figure 7:
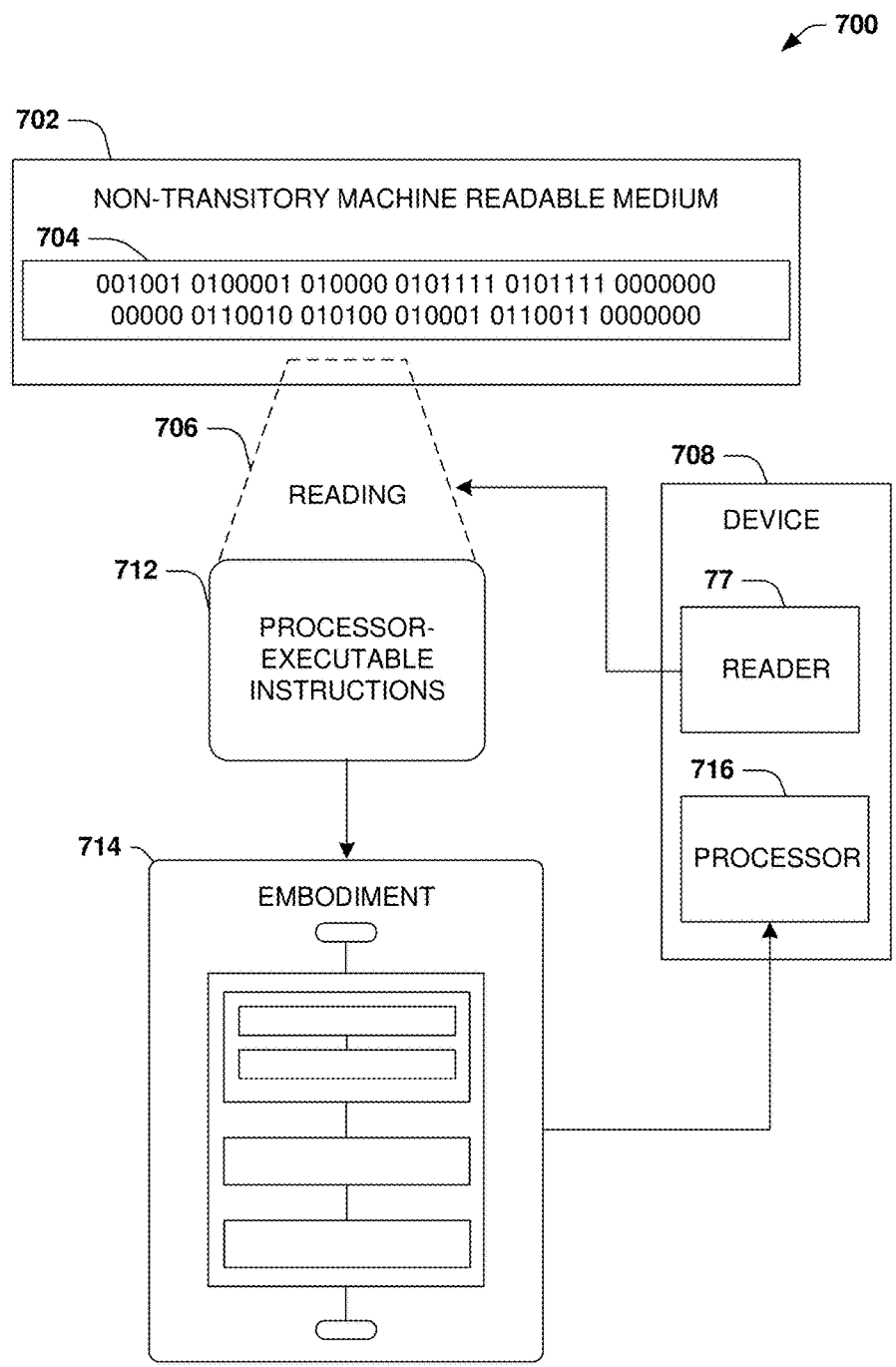
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein. The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed cause performance of operations, such as at least some of the example method 400 of FIG. 4, for example. In some embodiments, the processor-executable instructions 712 are configured to cause implementation of a system, such as at least some of the example system 500 of FIGS. 5A-5C and/or at least some of the example system 600 of FIGS. 6A-6C, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
identifying a video;
determining a grayscale video of the video and a color video of the video;
playing the grayscale video and the color video within a non-visible region of a user device;
applying grayscale percentages of the grayscale video to color pixels of the color video to create alpha color pixels;
rendering, based upon the alpha color pixels associated with the grayscale video and the color video, the video within a canvas overlaying content of a webpage displayed through a user interface, wherein the rendering comprises displaying an opaque element of the video at least partially overlaying one or more elements of the webpage;
creating a temporary array;
populating the temporary array with transparency data of the video;
tracking a position of a pointer with respect to the canvas; and
responsive to receiving a user input while the position of the pointer corresponds to a portion of the video:
transforming coordinates of the position of the pointer into a lookup value;
identifying a transparency value at an array position in the temporary array corresponding to the lookup value;
responsive to the transparency value being greater than or equal to a threshold value, performing a first action upon the canvas; and
responsive to the transparency value being less than the threshold value, performing a second action upon the canvas.

2. The method of claim 1, wherein the populating the temporary array comprises:
traversing a grayscale array, of the grayscale video, to populate the temporary array with transparency values corresponding to amounts of black within the grayscale video.

3. The method of claim 2, wherein the traversing comprises:
transferring transparency values at every nth position of the grayscale array into the temporary array.

4. The method of claim 3, wherein the nth position is a $4^{th}$ position.

5. The method of claim 1, comprising:
deleting the temporary array and repopulating the temporary array with new transparency data at a fixed rate.

6. The method of claim 1, wherein the rendering comprises displaying at least a part of the one or more elements of the webpage on which the opaque element does not overlay.

7. The method of claim 1, wherein the one or more elements of the webpage comprise one or more links on the webpage.

8. The method of claim 1, wherein the tracking a position of a pointer comprises:
creating a pointer pixel image to represent the position of the pointer; and
updating a location of the pointer pixel image based upon changes in position of the pointer.

9. The method of claim 8, wherein the pointer pixel image is a 2×2 pixel image.

10. The method of claim 8, comprising:
offsetting the pointer pixel image from the canvas by an offset such that the pointer pixel image is not visible to a user.

11. The method of claim 1, wherein the transforming coordinates of the position comprises:
transforming Cartesian coordinates of the position of the pointer into a linear lookup value into the temporary array.

12. The method of claim 1, wherein the performing a first action comprises:
identifying a target webpage linked to by the video; and
transitioning the user interface from the webpage to the target webpage.

13. The method of claim 1, wherein the performing a second action comprises:
closing the canvas to terminate the video.

14. The method of claim 1, comprising:
selecting a first value as the threshold value based upon the video being provided by a first content provider; and
selecting a second value as the threshold value based upon the video being provided by a second content provider.

15. A computing device comprising:
a processor; and
memory comprising processor-executable instructions that when executed by the processor cause performance of operations, the operations comprising:
identifying a video;
determining a grayscale video of the video and a color video of the video, wherein grayscale percentages of the grayscale video and color pixels of the color video are used to render the video while the grayscale video and the color video are played within a non-visible region of a user device;
rendering, based upon alpha color pixels associated with the grayscale video and the color video, the video within a canvas overlaying content of a webpage displayed through a user interface, wherein the rendering comprises displaying an opaque element of the video at least partially overlaying one or more elements of the webpage;
populating a temporary array with transparency data of the video, wherein the populating comprises traversing a grayscale array, of the grayscale video, to populate the temporary array with transparency values corresponding to amounts of black within the grayscale video; and responsive to receiving a user input with coordinates corresponding to the canvas:
  identifying a transparency value at an array position in the temporary array corresponding to the coordinates;
  responsive to the transparency value being greater than or equal to a threshold value, performing a first action upon the canvas; and
  responsive to the transparency value being less than the threshold value, performing a second action upon the canvas.

16. The computing device of claim 15, wherein the operations comprise:
  identifying a target content linked to by the video; and
  performing the first action to transition the user interface from the content to the target content.

17. The computing device of claim 15, wherein the operations comprise:
  performing the second action to close the canvas to terminate the video.

18. The computing device of claim 15, wherein the first action is different than the second action.

19. The computing device of claim 15, wherein the operations comprise:
  transferring transparency values at every nth position of the grayscale array into the temporary array.

20. A non-transitory machine readable medium having stored thereon processor-executable instructions that when executed cause performance of operations, the operations comprising:
  identifying a video;
  determining a grayscale video of the video and a color video of the video;
  playing the grayscale video and the color video within a non-visible region of a user device;
  applying grayscale percentages of the grayscale video to color pixels of the color video to create alpha color pixels;
  rendering, based upon the alpha color pixels associated with the grayscale video and the color video, the video within a canvas overlaying content of a webpage displayed through a user interface, wherein the rendering comprises displaying an opaque element of the video at least partially overlaying one or more elements of the webpage;
  tracking a position of a pointer with respect to the canvas; and
  responsive to receiving a user input while the position of the pointer corresponds to the canvas:
    identifying a transparency value, of the video, associated with the position;
    responsive to the transparency value being indicative of the opaque portion, transitioning a user interface from displaying content over which the canvas is displayed to displaying a target webpage linked to by the video; and
    responsive to the transparency value being indicative of the transparent portion, closing the canvas to terminate the video.

* * * * *